US012235489B2

(12) United States Patent
Harris et al.

(10) Patent No.: US 12,235,489 B2
(45) Date of Patent: *Feb. 25, 2025

(54) MULTI-TENANT ISOLATION ON A MULTI-RETICLE PHOTONIC COMMUNICATION PLATFORM

(71) Applicant: Lightmatter, Inc., Boston, MA (US)

(72) Inventors: Nicholas C. Harris, Menlo Park, CA (US); Robert Turner, Georgetown, TX (US)

(73) Assignee: Lightmatter, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,906

(22) Filed: Mar. 1, 2024

(65) Prior Publication Data

US 2024/0264372 A1   Aug. 8, 2024

Related U.S. Application Data

(63) Continuation of application No. 17/964,337, filed on Oct. 12, 2022, now Pat. No. 11,953,724.

(Continued)

(51) Int. Cl.
*G02B 6/12* (2006.01)
(52) U.S. Cl.
CPC ............ *G02B 6/12007* (2013.01); *G02B 2006/12145* (2013.01); *G02B 2006/12159* (2013.01)
(58) Field of Classification Search
None
See application file for complete search history.

(56) References Cited

U.S. PATENT DOCUMENTS

| 5,771,323 A | 6/1998 | Trott |
| 5,930,429 A | 7/1999 | Trott |

(Continued)

FOREIGN PATENT DOCUMENTS

| EP | 2 212 887 A1 | 8/2010 |
| EP | 3 159 721 A1 | 4/2017 |

(Continued)

OTHER PUBLICATIONS

International Preliminary Report on Patentability mailed Nov. 26, 2020, in connection with International Application No. PCT/US2019/029803.

(Continued)

*Primary Examiner* — Jerry Rahll
(74) *Attorney, Agent, or Firm* — Wolf, Greenfield & Sacks, P.C.

(57) ABSTRACT

Described herein are photonic communication platforms that permit use by multiple users in a secure way. A platform comprises a substrate, a first photonic circuit monolithically integrated with the substrate, and a second photonic circuit monolithically integrated with the substrate. The first photonic circuit is patterned with a first plurality of photonic modules, the photonic modules of the first plurality being copies of a common template photonic module The second photonic circuit is patterned with a second plurality of photonic modules, the photonic modules of the second plurality being copies of the common template photonic module. A photonic link couples the first photonic circuit to the second photonic circuit. A controller optically isolates the first photonic circuit from the second photonic circuit by optically interrupting the photonic link.

20 Claims, 15 Drawing Sheets

Related U.S. Application Data

(60) Provisional application No. 63/255,330, filed on Oct. 13, 2021.

(56) References Cited

U.S. PATENT DOCUMENTS

| | | |
|---|---|---|
| 6,202,165 B1 | 3/2001 | Pine |
| 6,477,285 B1 | 11/2002 | Shanley |
| 7,251,386 B1 | 7/2007 | Dickinson et al. |
| 9,671,572 B2 | 6/2017 | Decker et al. |
| 9,922,887 B2 | 3/2018 | Vermeulen et al. |
| 10,847,467 B2 | 11/2020 | Collins et al. |
| 11,036,002 B2 | 6/2021 | Harris et al. |
| 2002/0028045 A1 | 3/2002 | Yoshimura et al. |
| 2005/0224946 A1 | 10/2005 | Dutta |
| 2007/0280585 A1 | 12/2007 | Warashina et al. |
| 2008/0044128 A1 | 2/2008 | Kish, Jr. et al. |
| 2008/0089640 A1 | 4/2008 | Beausoleil |
| 2009/0103345 A1 | 4/2009 | Mclaren et al. |
| 2009/0103855 A1 | 4/2009 | Binkert et al. |
| 2010/0054671 A1 | 3/2010 | Ban et al. |
| 2011/0052120 A1 | 3/2011 | Tan et al. |
| 2011/0073989 A1 | 3/2011 | Rong et al. |
| 2011/0128790 A1 | 6/2011 | Sarin et al. |
| 2011/0269456 A1 | 11/2011 | Krishnaswamy et al. |
| 2012/0149148 A1 | 6/2012 | Dallesasse et al. |
| 2012/0177381 A1 | 7/2012 | Dobbelaere et al. |
| 2012/0203695 A1 | 8/2012 | Morgan et al. |
| 2013/0051725 A1 | 2/2013 | Shinoda et al. |
| 2013/0071121 A1 | 3/2013 | Sharapov et al. |
| 2013/0156366 A1 | 6/2013 | Raj et al. |
| 2013/0209112 A1 | 8/2013 | Witzens |
| 2013/0243429 A1 | 9/2013 | Whelihan et al. |
| 2013/0292840 A1 | 11/2013 | Shoemaker et al. |
| 2013/0308893 A1 | 11/2013 | Zuffada et al. |
| 2014/0040698 A1 | 2/2014 | Loh et al. |
| 2014/0043050 A1 | 2/2014 | Stone et al. |
| 2014/0264400 A1 | 9/2014 | Lipson et al. |
| 2014/0268980 A1 | 9/2014 | Kim et al. |
| 2014/0294342 A1 | 10/2014 | Offrein et al. |
| 2014/0300008 A1 | 10/2014 | Duan et al. |
| 2014/0363124 A1 | 12/2014 | Pelley et al. |
| 2014/0363172 A1 | 12/2014 | Pelley et al. |
| 2015/0381273 A1 | 12/2015 | Gloeckner et al. |
| 2016/0085038 A1 | 3/2016 | Decker et al. |
| 2016/0181322 A1 | 6/2016 | Mazed et al. |
| 2016/0191188 A1 | 6/2016 | Butler |
| 2016/0216445 A1 | 7/2016 | Thacker et al. |
| 2016/0252688 A1 | 9/2016 | Barwicz et al. |
| 2017/0108655 A1 | 4/2017 | Zarbock et al. |
| 2017/0160474 A1 | 6/2017 | Mahmoodian et al. |
| 2017/0194309 A1 | 7/2017 | Evans et al. |
| 2019/0162901 A1 | 5/2019 | Yu et al. |
| 2019/0335252 A1 | 10/2019 | Ryan |
| 2020/0006304 A1 | 1/2020 | Chang et al. |
| 2020/0111720 A1 | 4/2020 | Wan et al. |
| 2020/0284981 A1 | 9/2020 | Harris et al. |
| 2021/0118853 A1 | 4/2021 | Harris et al. |
| 2021/0215897 A1 | 7/2021 | Epitaux et al. |
| 2021/0242124 A1 | 8/2021 | Kannan et al. |
| 2021/0278590 A1 | 9/2021 | Harris et al. |
| 2021/0375829 A1 | 12/2021 | Or-Bach et al. |
| 2022/0109075 A1 | 4/2022 | Byrd et al. |
| 2023/0114842 A1 | 4/2023 | Harris et al. |
| 2023/0114847 A1 | 4/2023 | Harris et al. |
| 2023/0308188 A1 | 9/2023 | Dorta-Quinones et al. |
| 2023/0314711 A1 | 10/2023 | Eslampour et al. |
| 2023/0314742 A1 | 10/2023 | Dorta-Quinones et al. |
| 2023/0388024 A1 | 11/2023 | Tymchenko et al. |

FOREIGN PATENT DOCUMENTS

| | | |
|---|---|---|
| JP | 2005-502127 A | 1/2005 |
| JP | 2011-503760 A | 1/2011 |
| JP | 2015-062027 A | 4/2015 |
| JP | 2018-506072 A | 3/2018 |
| JP | 2018-093007 A | 6/2018 |
| JP | 2018-195723 A | 12/2018 |
| TW | 508834 B | 11/2002 |
| WO | WO 2011/143548 A2 | 11/2011 |
| WO | WO 2016/008771 A1 | 1/2016 |

OTHER PUBLICATIONS

International Preliminary Report on Patentability mailed Sep. 16, 2021, in connection with International Application No. PCT/US2020/021209.

International Preliminary Report on Patentability mailed Aug. 18, 2022, in connection with International Application No. PCT/US2021/016129.

International Search Report and Written Opinion dated Jul. 6, 2020, in connection with International Application No. PCT/US2020/021209.

International Search Report and Written Opinion dated Sep. 3, 2019, in connection with International Application No. PCT/US2019/029803.

International Search Report and Written Opinion dated Jan. 26, 2023, in connection with International Application No. PCT/US2022/043209.

International Search Report and Written Opinion mailed Apr. 14, 2021, in connection with International Application No. PCT/US2021/016129.

International Search Report and Written Opinion mailed Jan. 18, 2023, in connection with International Application No. PCT/US2022/046379.

International Search Report and Written Opinion mailed Nov. 29, 2023, in connection with International Application No. PCT/US2023/065007.

Invitation to Pay Additional Fees dated May 1, 2020, in connection with International Application No. PCT/US2020/021209.

Invitation to Pay Additional Fees mailed Nov. 7, 2022, in connection with International Application No. PCT/US2022/043029.

Invitation to Pay Additional Fees dated Jun. 19, 2019, in connection with International Application No. PCT/US2019/029803.

Extended European Search Report dated Feb. 11, 2022, in connection with European Application No. 19803311.0.

Extended European Search Report dated Nov. 4, 2022, in connection with European Application No. 20766814.6.

Singapore Search Report and Written Opinion mailed May 13, 2022, in connection with Singapore Application No. 11202011400P.

Beausoleil et al., Nanoelectronic and nanophotonic interconnect. Proceedings of the IEEE. Feb. 2008;96(2):230-47. doi:10.1109/JPROC.2007.911057.

Fujikata et al., LSI on-chip optical interconnection with Si nanophotonics. Extended Abstracts of the 2007 International Conference on Solid State Devices and Materials. 2007. pp. 276-277.

Grigalunas, Tell Me—What Is Wafer Dicing? Eastern States Components, LLC. Sep. 26, 2017. 2 pages. URL:https://www.escomponents.com/blog/2017/9/26/tell-me-what-is-wafer-dicing [retrieved Jul. 13, 2020].

Orcutt et al., Open foundry platform for high-performance electronic-photonic integration. Optics Express. May 21, 2012;20(11).11 Pages.

Udipi et al., Combining memory and a controller with photonics through 3D-stacking to enable scalable and energy-efficient systems. 38th Annual International Symposium on Computer Architecture (ISCA). Jun. 8, 2011;425-436.

Wada, Electronics and Photonics Convergence on Si CMOS Platform. Proc. of SPIE. 2004;5357:16-24.

Young et al., Optical technology for energy efficient I/O in high performance computing. IEEE Communications Magazine. Oct. 2010;48:184-91.

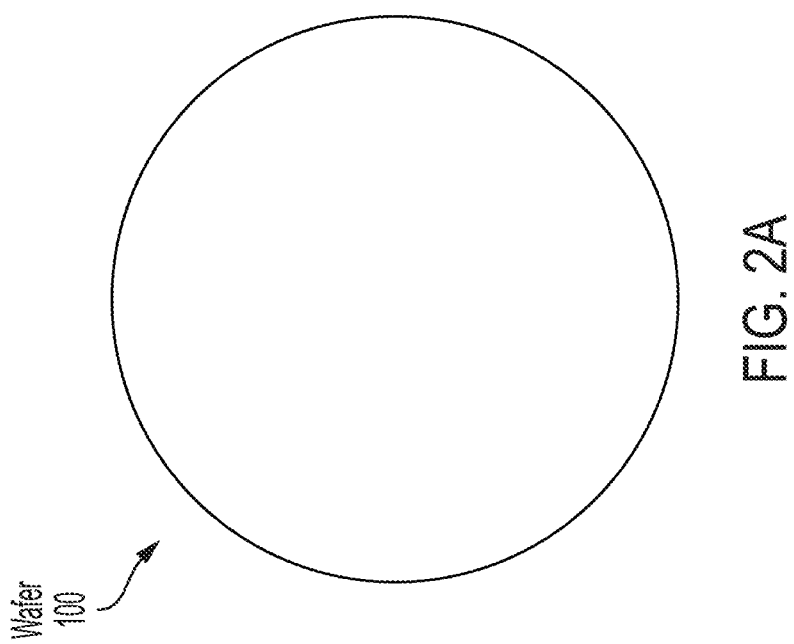

MULTI-TENANT ISOLATION ON A MULTI-RETICLE PHOTONIC COMMUNICATION PLATFORM

CROSS-REFERENCE TO RELATED APPLICATIONS

This application is a Continuation claiming the benefit under 35 U.S.C. § 120 of U.S. patent application Ser. No. 17/964,337, filed Oct. 12, 2022, entitled "MULTI-TENANT ISOLATION ON A MULTI-RETICLE PHOTONIC COMMUNICATION PLATFORM," which claims the benefit under 35 U.S.C. § 119(e) to U.S. Provisional Application Ser. No. 63/255,330, filed on Oct. 13, 2021, entitled "MULTI-TENANT ISOLATION ON A MULTI-RETICLE PHOTONIC COMMUNICATION PLATFORM," each of which is hereby incorporated herein by reference in their entirety.

BACKGROUND

Computer systems include random-access memories (RAM) for storing data and machine code. RAMs are typically volatile memories, such that the stored information is lost when power is removed. In modern implementations, memories take the form of integrated circuits. Each integrated circuit includes several memory cells. To enable access to stored data and machine code, memories are place in electrical communication with processors. Typically, these electrical communications are implemented as metal traces formed on the substrates on which the memories and the processors are disposed.

SUMMARY OF THE DISCLOSURE

Some embodiments relate to a photonic communication platform, comprising: a substrate; a first photonic circuit monolithically integrated with the substrate, wherein the first photonic circuit is patterned with a first plurality of photonic modules, the photonic modules of the first plurality being copies of a common template photonic module; a second photonic circuit monolithically integrated with the substrate, wherein the second photonic circuit is patterned with a second plurality of photonic modules, the photonic modules of the second plurality being copies of the common template photonic module; a photonic link coupling the first photonic circuit to the second photonic circuit; and a controller configured to cause optical isolation of the first photonic circuit from the second photonic circuit by optically interrupting the photonic link.

In some embodiments, the photonic communication platform further comprises an optical switch having an output coupled to the photonic link, wherein optically interrupting the photonic link comprises controlling the optical switch to route light away from the output.

In some embodiments, the optical switch comprises a Mach-Zehnder interferometer and the output comprises a first output arm of the Mach-Zehnder interferometer, wherein controlling the optical switch to route light away from the output comprises controlling the Mach-Zehnder interferometer to route the light to a second output arm of the Mach-Zehnder interferometer.

In some embodiments, the controller is further configured to provide access to the first photonic circuit to a first user; and provide access to the second photonic circuit to a second user.

In some embodiments, the controller is further configured to deny access to the first photonic circuit to the second user; and deny access to the second photonic circuit to the first user.

In some embodiments, the photonic communication platform further comprises a first die in communication with a first photonic module of the first plurality; and a second die in communication with a first photonic module of the second plurality.

In some embodiments, the first die is stacked on top of the first photonic module of the first plurality and the second die is stacked on top of the first photonic module of the second plurality.

In some embodiments, the first die is electronically isolated from the second die.

In some embodiments, the first die comprises a first processor and the second die comprises a second processor.

In some embodiments, the photonic communication platform further comprises a third die in communication with a second photonic module of the first plurality; and a fourth die in communication with a second photonic module of the second plurality.

In some embodiments, the first photonic circuit places the first die in optical communication with the third die, and the second photonic circuit places the second die in optical communication with the fourth die.

Some embodiments relate to a method for operating a photonic communication platform, comprising: obtaining a substrate comprising: a first photonic circuit monolithically integrated with the substrate, wherein the first photonic circuit is patterned with a first plurality of photonic modules, the photonic modules of the first plurality being copies of a common template photonic module; a second photonic circuit monolithically integrated with the substrate, wherein the second photonic circuit is patterned with a second plurality of photonic modules, the photonic modules of the second plurality being copies of the common template photonic module; and a photonic link coupling the first photonic circuit to the second photonic circuit; and optically isolating the first photonic circuit from the second photonic circuit by optically interrupting the photonic link.

In some embodiments, the substrate further comprises an optical switch having an output coupled to the photonic link, wherein optically interrupting the photonic link comprises controlling the optical switch to route light away from the output.

In some embodiments, the optical switch comprises a Mach-Zehnder interferometer and the output comprises a first output arm of the Mach-Zehnder interferometer, wherein controlling the optical switch to route light away from the output comprises controlling the Mach-Zehnder interferometer to route the light to a second output arm of the Mach-Zehnder interferometer.

In some embodiments, the method further comprises providing access to the first photonic circuit to a first user; and providing access to the second photonic circuit to a second user.

In some embodiments, the method further comprises denying access to the first photonic circuit to the second user; and denying access to the second photonic circuit to the first user.

In some embodiments, the method further comprises controlling the first photonic circuit to permit electronic communication between a first die and a first photonic module of the first plurality; and controlling the second photonic circuit to permit electronic communication between a second die and a first photonic module of the second plurality.

In some embodiments, the first die is stacked on top of the first photonic module of the first plurality and the second die is stacked on top of the first photonic module of the second plurality.

In some embodiments, optically isolating the first photonic circuit from the second photonic circuit comprises electronically isolating the first die from the second die.

In some embodiments, the first die comprises a first processor and the second die comprises a second processor.

In some embodiments, the method further comprises controlling the first photonic circuit to permit electronic communication between a third die and a second photonic module of the first plurality; and controlling the second photonic circuit to permit electronic communication between a fourth die and a second photonic module of the second plurality.

In some embodiments, the method further comprises controlling the first photonic circuit to place the first die in optical communication with the third die; and controlling the second photonic circuit to place the second die in optical communication with the fourth die.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in the figures in which they appear.

FIG. 2A illustrates a semiconductor wafer, in accordance with some embodiments.

DETAILED DESCRIPTION

I. Overview

The inventors have recognized and appreciated that certain photonic circuits are not suitable for use by multiple users because they do not provide any means for ensuring security of data among the users. The inventors have developed photonic communication platforms that support operation by multiple users in way that ensures that the data of a user are not accessible by the other users. The photonic communication platforms developed by the inventors and described herein rely on so-called "photonic modules" (also referred to herein as "photonic tiles" or simply "tiles"). A photonic module includes means for photonically routing optical signals to other neighboring photonic modules in a configurable fashion, thereby forming a communication fabric enabling networks of arbitrary architectures. Photonic modules may be defined as copies of a template photonic module using photolithographic, step-and-repeat manufacturing process.

The photonic communication platforms developed by the inventors and described herein include wafer-scale photonic integrated circuits. In one example, a wafer supports a cluster of computers networked together by means of photonic modules. The inventors have appreciated that the entire cluster of computers may be too large for use by a single user, which could result in significant downtime of computing resources. Leveraging the platforms described herein, the same wafer can support use by multiple parallel users. For example, different portions of a cluster may be licensed to different customers, thereby increasing the utilization of the cluster.

The inventors have recognized and appreciated, however, that allowing multiple users to share the same platform poses a data security challenge as a user may inadvertently (or intentionally) attempt to access data reserved to other users. In some embodiments, this can be addressed by configuring photonic fire walls between portions of a photonic wafer. This involves interrupting a photonic link that, under different circumstances, would couple photonic modules allocated to a user to photonic modules allocated to another user. When interrupted, the photonic link still physically connects the photonic modules allocated to different users, but does not permit passage of light encoded with data reserved to a user or does not permit passage of light at all.

II. Photonic Communication Platforms

Figure 1:
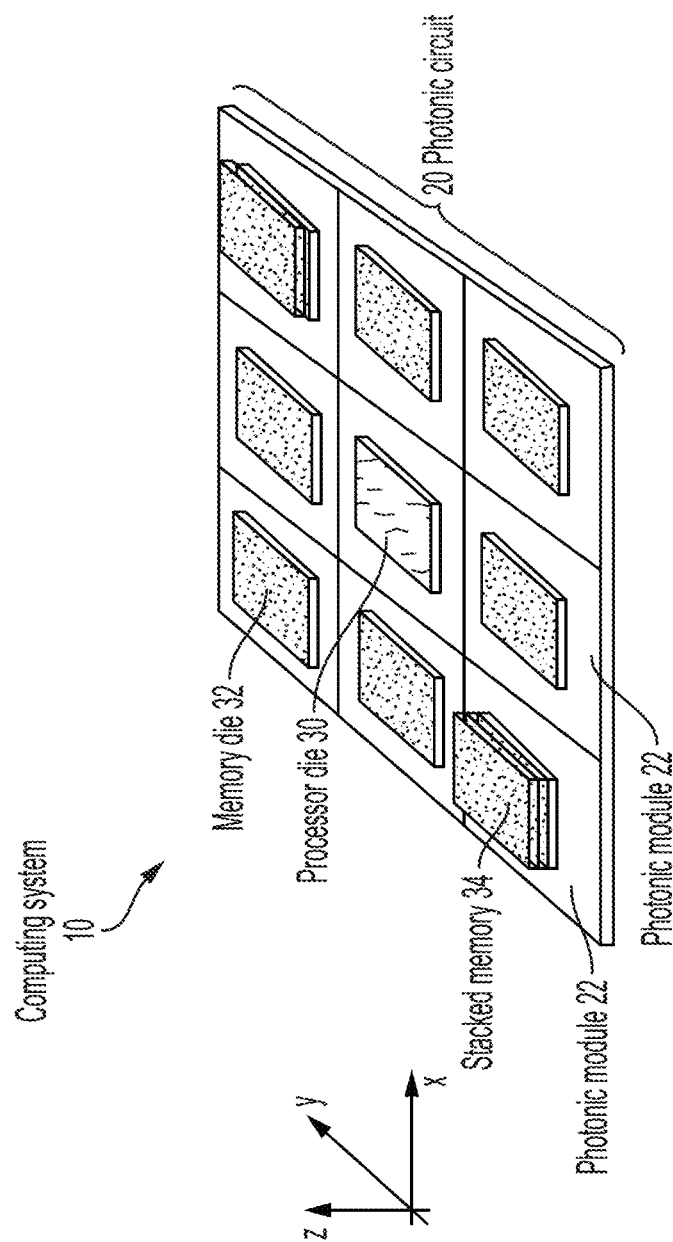
FIG. 1 illustrates a computing system based on a photonic communication platform, in accordance with some embodiments.

FIG. 1 illustrates an example computing system based on a photonic communication platform with nine photonic modules arranged in a 3×3 topology, in accordance with one example. Computing system 10 includes a photonic circuit 20 patterned with nine photonic modules 22. This photonic communication platform supports one processor die (30) positioned in the middle of photonic circuit 20, and eight memory nodes surrounding the processor die. Some of the memory nodes include a single memory chip (see for example memory die 32). Other memory nodes include a stacked memory including multiple vertically-stacked memory dies (see for example stacked memory 34). The dies are stacked on top of the wafer that defines the photonic modules. The dies can communicate with the photonic module electronically (e.g., using through-silicon vias, copper pillars, micro-bumps, ball-grid arrays or other electrical interconnects) and/or optically (e.g., using grating couplers, prisms, lenses or other optical couplers).

As described in detail further below, the photonic modules may be patterned with optical waveguides and optical distribution networks. The optical distribution network of a photonic module can selectively place the die of that particular node in optical communication with any other die of the computing system. For example, the optical distribution network of the photonic module positioned under processor die 30 may be reconfigured depending on the needs of the processor. At the beginning of a routine, the processor may need to access data stored in a first memory node. This read operation involves configuring the respective optical distribution networks to place the processor in optical communication with the first memory node. Later in the routine, the processor may need to write data into a second memory node. This write operation involves reconfiguring the optical distribution networks to place the processor in optical communication with the second memory node.

Manufacturing photonic modules in large scales can be costly. The photonic communication platforms described herein are engineered in a way that limits manufacturing costs. These platforms rely on the use of common photomask sets to fabricate multiple photonic modules. This approach reduces costs in two ways. First, it reduces additional costs that would otherwise be incurred in procuring several different photomask sets. Second, it enables fabrication of photonic modules using standard semiconductor foundries, some of which require that the same photomask set (or at least one photomask) be used across an entire wafer. Designing photonic modules that share at least one photomask enables fabrication of many photonic modules on the same semiconductor wafer while leveraging standard, low-cost step-and-repeat manufacturing processes.

III. Photonic Modules

The photonic modules described herein may be manufactured using microfabrication techniques, including for example complementary metal-oxide-semiconductor (CMOS) microfabrication techniques. Accordingly, some embodiments relate to silicon photonics-based optical communication platforms. Some particular microfabrication techniques involve step-and-repeat approaches-whereby stepper machines are used to pattern a semiconductor wafer with multiple copies of a template layout (e.g., a reticle). FIG. 2A through FIG. 2E illustrate microfabrication techniques for manufacturing photonic modules. FIGS. 3A through 3F illustrate examples of photonic modules patterned using these microfabrication techniques.

Referring first to FIG. 2A, this figure illustrates a semiconductor wafer 100. Wafer 100 may be made of any material. For example, wafer 100 may be made of (or otherwise include) silicon. In one example, wafer 100 is a silicon-on-insulator (SOI) wafer. In another example, wafer 100 is a bulk silicon wafer. Wafer 100 may have any size. For example, the diameter of wafer 100 may be 150 mm, 300 nm, or 450 mm, among other possible values. However, not all wafers need to have a circular shape.

Figure 2B:
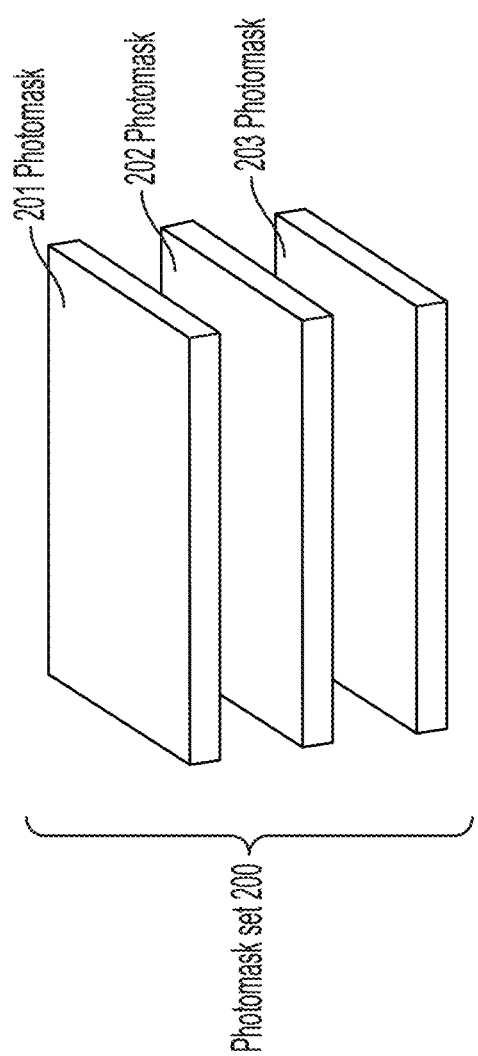
FIG. 2B illustrates a set of photomasks, in accordance with some embodiments.

FIG. 2B illustrates a set of photomasks that may be used for patterning wafer 100 using photolithographic techniques. Photomask set 200 includes three photomasks (201, 202 and 203), though other sets may include more or fewer photomasks. Each photomask has a particular pattern of opaque and transparent regions. When the photomask is exposed to light, the opaque regions block the light, thereby preventing it from shining a wafer, and the transparent regions allow passage of the light. The result is that the pattern of the photomask is transferred to the wafer.

Figure 2C:
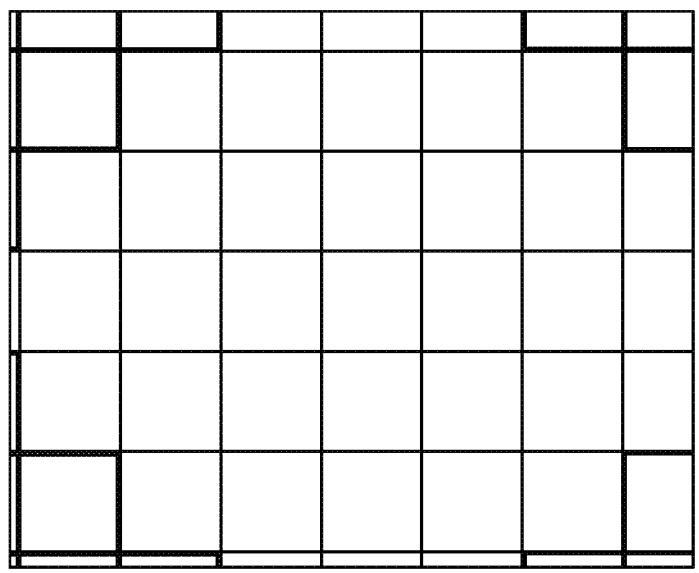
FIG. 2C illustrates an example photomask for forming optical waveguides, in accordance with some embodiments.

Each photomask may define a particular layer of a photonic module. One photomask may be used to define optical waveguides. When the wafer goes through an etch process, only the exposed regions (or only the non-exposed regions) are etched away, while the other regions remain un-etched. This photomask may be patterned to form a network of optical waveguides when the wafer is exposed to light through this photomask. FIG. 2C illustrates a portion of a photomask that may be used to form waveguides on wafer 100. The lines of photomask 201 represent opaque regions. The background of photomask 201 is transparent. Exposure of photomask 201 to light so that an image of the photomask is projected onto wafer 100 enables patterning of waveguides in the shapes of the opaque regions. In this particular example, the pattern of lines of the photomask results in a grid of waveguides.

Some photonic modules involve use of different levels of optical waveguides. In some such embodiments, photomask set 200 may include a dedicated photomask for each waveguide level. Another photomask may be used to define n-doped regions. When the wafer goes through an ion implantation or dopant diffusion process, only the exposed regions (or only the non-exposed regions) receive the doping, while the other regions remain undoped. Another photomask may be used to define p-doped regions using a similar process. Some photonic modules involve use of different doping concentrations. In some such embodiments, photomask set 200 may include a dedicated photomask for each doping concentration. In other embodiments, photomask set 200 may include photomasks used to define deposition of semiconductor materials other than silicon, such as germanium and/or other materials of the periodic table, such as Groups III or V. Another photomask may be used to define metal contacts. Another photomask may be used to define metal traces. Some photonic modules involve use of different levels of metal traces. In some such embodiments, photomask set 200 may include a dedicated photomask for each metal trace level.

In some embodiments, wafer 100 is patterned in a step-and-repeat fashion. When wafer 100 is processed in a stepper machine, the pattern of a photomask is exposed repeatedly across the surface of the wafer, in a grid. This process involves moving the wafer in steps back and forth and left and right under the lens of the stepper, and exposing the photomask at each step. The result is that wafer 100 is patterned with multiple copies of the pattern defined by a photomask. This operation may be repeated for each photomask (or at least some photomasks) of the set.

Figure 2D:
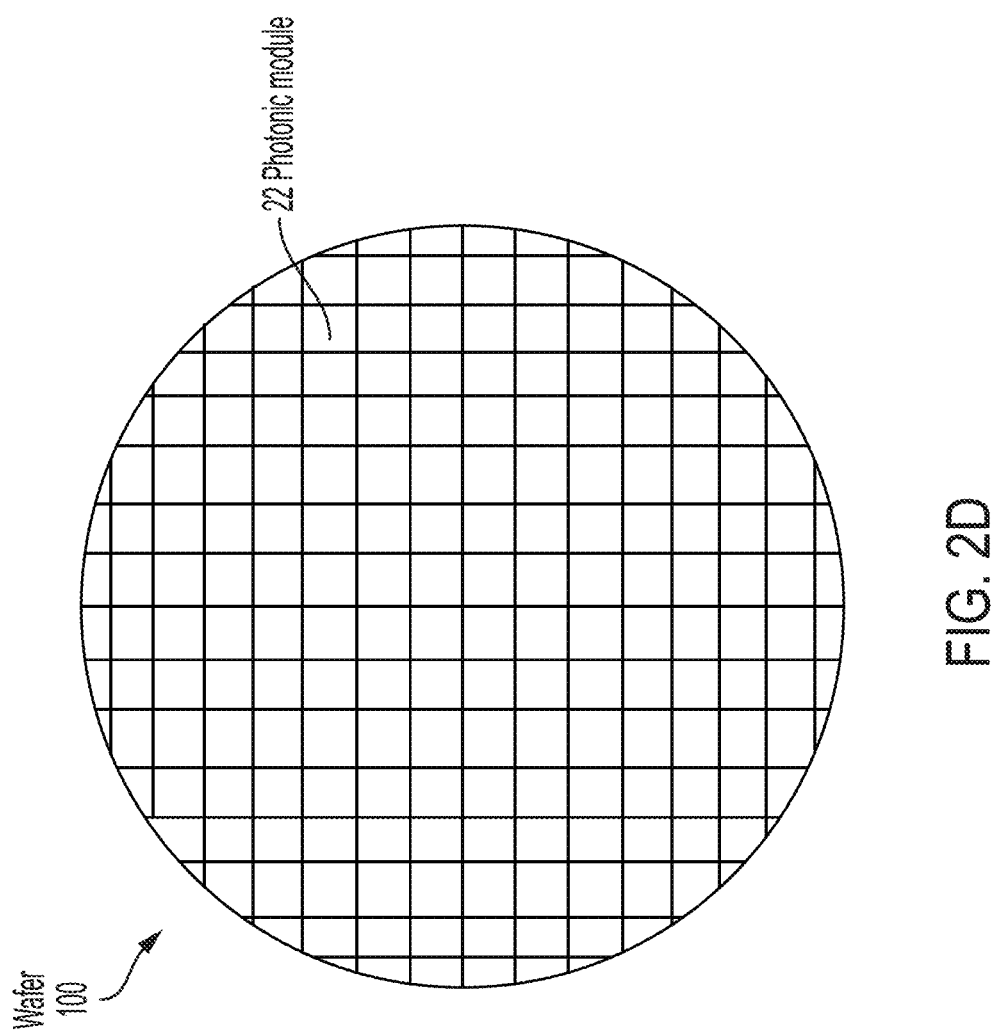
FIG. 2D illustrates the wafer of FIG. 2A patterned in accordance with the photomask set of FIG. 2B, in accordance with some embodiments.
Figure 2E:
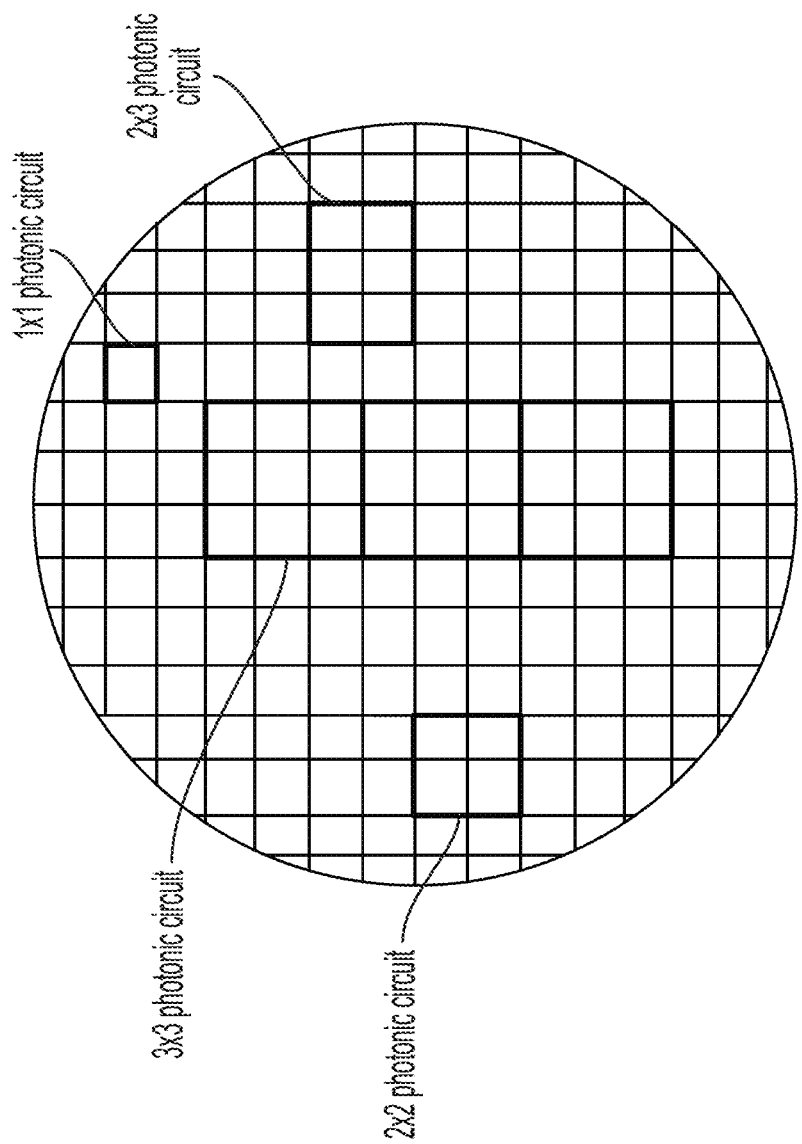
FIG. 2E identifies photonic circuits formed on the patterned wafer of FIG. 2D, in accordance with some embodiments.

In some embodiments, this process may be used to pattern wafer 100 with multiple copies of a template photonic module. In the example of FIG. 2D, wafer 100 has been patterned with a grid of photonic modules 22. The photonic modules may share the pattern of one or more photomasks of set 200. For example, the photonic modules may share the pattern of the same waveguide photomask(s) and/or the same m trace photomask(s). In other embodiments, the photonic modules share the pattern of all the photomasks of set 200. For example, the photonic modules may share the same optical waveguide pattern, the same n-doping pattern, the same p-doping pattern, the same contact pattern, the same metal trace pattern, etc.

In some embodiments, the entire surface of wafer 100 is patterned using photomask set 200. However, not all embodiments are limited in this respect as some portions of wafer 100 may be patterned using a first photomask set and other portions of wafer 100 may be patterned using a second photomask set. In some embodiments, the first and second photomask sets may share one or more common photomasks, such as a waveguide photomask.

Once patterned, wafer 100 may include multiple photonic circuits. In one example, the wafer of FIG. 2E has been marked to obtain six photonic circuits from wafer 100. The photonic circuits are monolithically integrated with the wafer. This figure identifies a 1×1 photonic circuit having only one photonic module 22, a 2×2 photonic circuit having four photonic modules 22, a 2×3 photonic circuit having six photonic modules 22, and three 3×3 photonic circuits having nine photonic modules 22 each. Separation of a photonic circuit from the wafer involves dicing the wafer along the perimeter of the desired photonic circuit. One of the 3×3 photonic circuits of wafer 100 may be used as the photonic circuit of the example computing system of FIG. 1 (see photonic circuit 20).

The techniques described in connection with FIGS. 2A-2D enable manufacturing of photonic modules at relatively low costs. Some semiconductor foundries require that the same photomask set (or at least one photomask) be used for patterning the entirety of a wafer (or at least a portion of a wafer). Otherwise, patterning different portions of a wafer using different photomasks would involve replacing one photomask for another between photolithographic exposures, which would make the step-and-repeat process inefficient and costly. Designing photonic modules that share at least one photomask enables fabrication of many photonic modules on the same semiconductor wafer while leveraging standard, low-cost step-and-repeat processes.

Figure 3A:
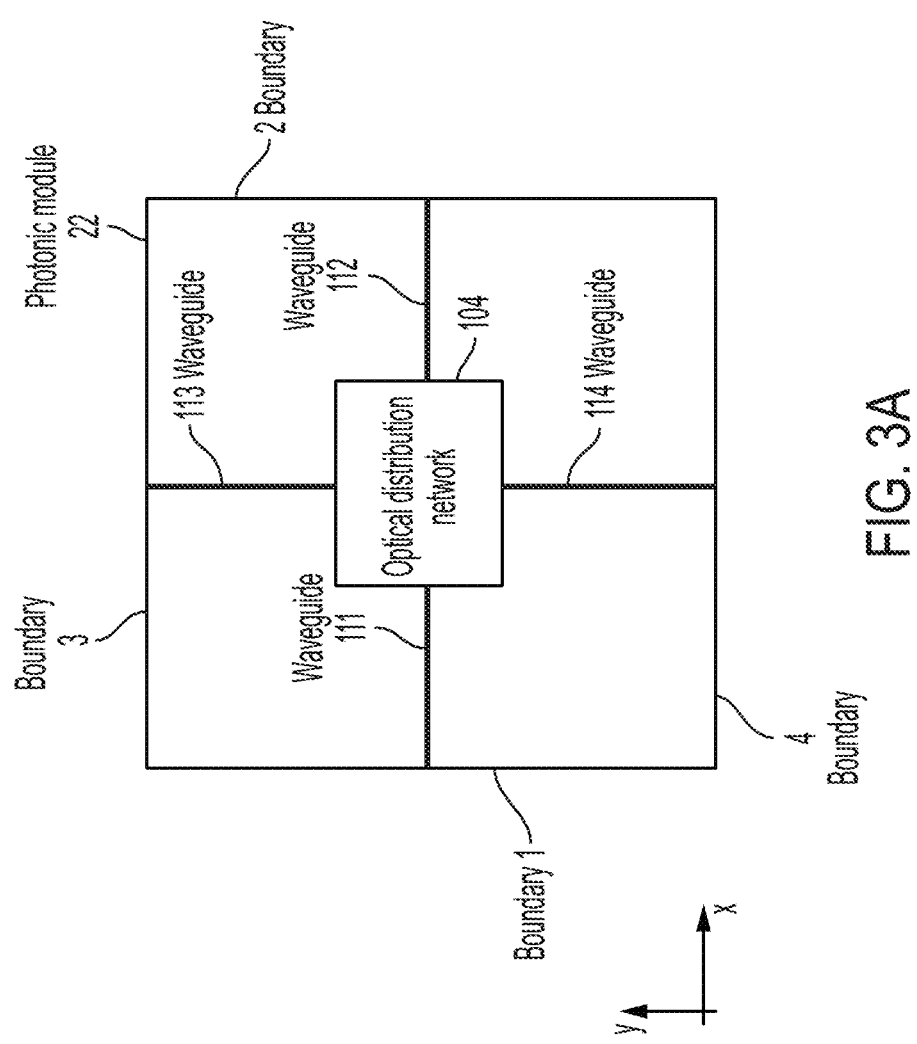
FIG. 3A illustrates an example photonic module of the patterned wafer of FIG. 2E, in accordance with some embodiments.

FIG. 3A illustrates an example photonic module 22. In this example, photonic module 22 is shaped as a rectangle (though other shapes are also possible, such as squares or other polygons). As such, photonic module 22 is bounded by four boundaries (boundaries 1, 2, 3 and 4). Boundary 1 is opposite to boundary 2, and boundary 3 is opposite to boundary 4. Boundary 1 is adjacent to boundaries 3 and 4, and boundary 2 is also adjacent to boundaries 3 and 4. Photonic module 22 includes an optical distribution network 104 coupled to waveguides 111, 112, 113 and 114. Waveguide 111 optically couples optical distribution network 104 to boundary 1. As such, optical signals coupled from optical distribution network 104 to waveguide 111 can be transferred outside the photonic module by crossing boundary 111. Similarly, waveguide 112 optically couples optical distribution network 104 to boundary 2, waveguide 113 optically couples optical distribution network 104 to boundary 3 and waveguide 114 optically couples optical distribution network 104 to boundary 4. In some embodiments, the boundaries of a photonic module are defined based on a photolithography shot (e.g., the boundaries are defined by the boundaries of the photomask(s) used to fabricate the photonic module). In other embodiments, however, one photolithography shot may define more than one photonic module. For example, a photomask may be patterned with multiple side-by-side instances of a template photonic module. In some such embodiments, the boundaries of a photonic module are defined where adjacent instances of the template photonic module meet.

While the example of FIG. 3A illustrates waveguides coupling the optical distribution network to each of the boundaries, not all embodiments are arranged in this manner. In other embodiments, a photonic module 22 may include two of these four waveguides, such as waveguides 111 and 112, or waveguides 111 and 113. In yet other embodiments, a photonic module 22 may include three of these four waveguides, such as waveguides 111, 112 and 113. Optical distribution network 104 includes photonics components (e.g., photonic switches) for routing optical signals inside and outside photonic module 22.

In some embodiments, a photonic module may include multiple layers of photonic waveguides. Similar to how multiple layers of conductive traces increase an electronic circuit's ability to route electric signals, multiple layers of waveguides increase a photonic module's ability to route optical signals. In one example, one layer includes silicon waveguides, and one layer includes silicon nitride waveguides. In another example, multiple layers include silicon waveguides. Additionally, or alternatively, multiple layers include silicon nitride waveguides. The choice of material of each waveguide layer may be determined by the wavelength of light that will be routed by the waveguide. For example, silicon and silicon nitride layers may be used for routing infrared light in the telecommunication bands with wavelengths around 1.3 μm or 1.5 μm. In some examples, the multiple layers of waveguides may also include aluminum nitride waveguides that can be used to route visible light down to UV wavelengths or aluminum oxide waveguides that are used to route UV light. Each layer may be arranged in a configuration similar to that illustrated in FIG. 3A—with an optical distribution network that routes signals among the waveguides of the layer.

Photonic module 22 may further include one or more out-of-plane couplers (not shown in FIG. 3A). An out-of-plane coupler may be configured to emit light outside the xy-plane, for example in a direction parallel to the z-axis or at an angle relative to the z-axis. An out-of-plane coupler may be further configured to capture light shining from outside the xy-plane. In some embodiments, an out-of-plane coupler enables optical communication between photonic module 22 and a die disposed above the photonic module and/or below the photonic module. An out-of-plane coupler may be implemented using any suitable optical component, including for example optical gratings, lenses, and prisms. In some embodiments, the optical distribution network may be configured so that the same out-of-plane coupler enables optical communication in both directions—from optical distribution network 104 to a die and from the die to optical distribution network 104.

Optical distribution network 104 may selectively couple any components of photonic module 22 to any other components of photonic module 22. For example, optical distribution network 104 may enable passage of light between waveguide 111 and waveguide 112, and/or between waveguide 111 and waveguide 113, and/or between waveguide 113 and waveguide 114, etc. This may be achieved by equipping the optical distribution network with controllable optical switches.

Figure 3B:
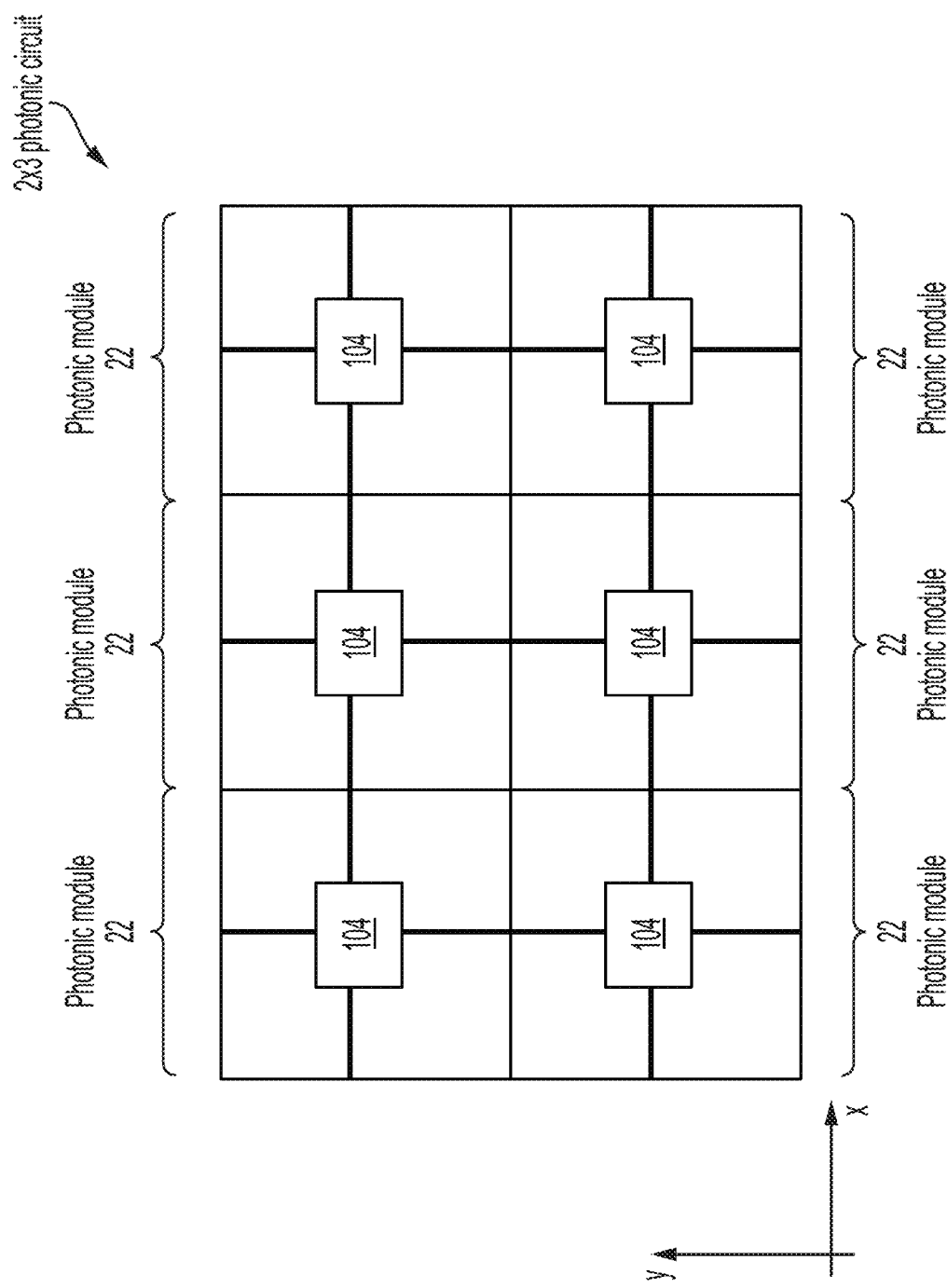
FIG. 3B illustrates a group of photonic modules of the type illustrated in FIG. 3A, in accordance with some embodiments.

A photonic circuit may include multiple photonic modules connected together to collectively form an optical network. FIG. 3B illustrates an example 2×3 photonic circuit including six photonic modules 22. This photonic circuit is obtained by dicing a group of 2×3 photonic modules off of wafer 100 (see FIG. 2E). The photonic modules 22 are arranged to that waveguide 111 of an optical module is aligned with waveguide 112 of the optical module to the left of that optical module, waveguide 112 of an optical module is aligned with waveguide 111 of the optical module to the right of that optical module, waveguide 113 of an optical module is aligned with waveguide 114 of the optical module above that optical module and waveguide 114 of an optical module is aligned with waveguide 113 of the optical module below that optical module. As a result, the optical modules form an optical network. Optical distribution networks 104 may route optical signals anywhere inside or outside the network. Suppose, for example, that a processor is mounted to the photonic module positioned at the north-west corner of the photonic circuit and that a memory is mounted to the photonic module positioned at the south-east corner of the photonic circuit. A read operation may involve reconfiguring the optical distribution networks (e.g., by controlling its optical switches) to place the processor in optical communication with the memory. For example, an optical communication path may be formed that 1) couples the processor to the out-of-plane coupler of the photonic module to which the processor is mounted, 2) couples the out-of-plane coupler of that photonic module to waveguide 112 of the same photonic module, 3) couples waveguide 112 of that photonic module to waveguide 111 of the adjacent photonic module (mid-uppermost photonic module), 4) couples waveguide 112 of the mid-uppermost photonic module to waveguide 111 of the next adjacent photonic module (north-east corner of the photonic circuit), 5) couples waveguide 114 of the photonic module positioned at north-east corner to waveguide 113 of the photonic module to which the memory is mounted, and 6) couples waveguide 113 of the photonic module to which the memory is mounted to the out-of-plane coupler of the same photonic module.

As discussed above, waveguides of adjacent photonic modules are optically coupled to one another, thereby permitting passage of light from one photonic module to the next. In some embodiments, the end of the waveguides may be physically connected. In other embodiments, there may be a gap between the waveguides. In this example, each waveguide has an end that is located at a distance from the boundary. Thus, a gap is formed at the boundary region. Notwithstanding the gap, the waveguides of the adjacent photonic module are still optically coupled to each other. In this case, in fact, light emitted at the end of a waveguide reaches the end of the other waveguide by free space propagation.

Figure 4:
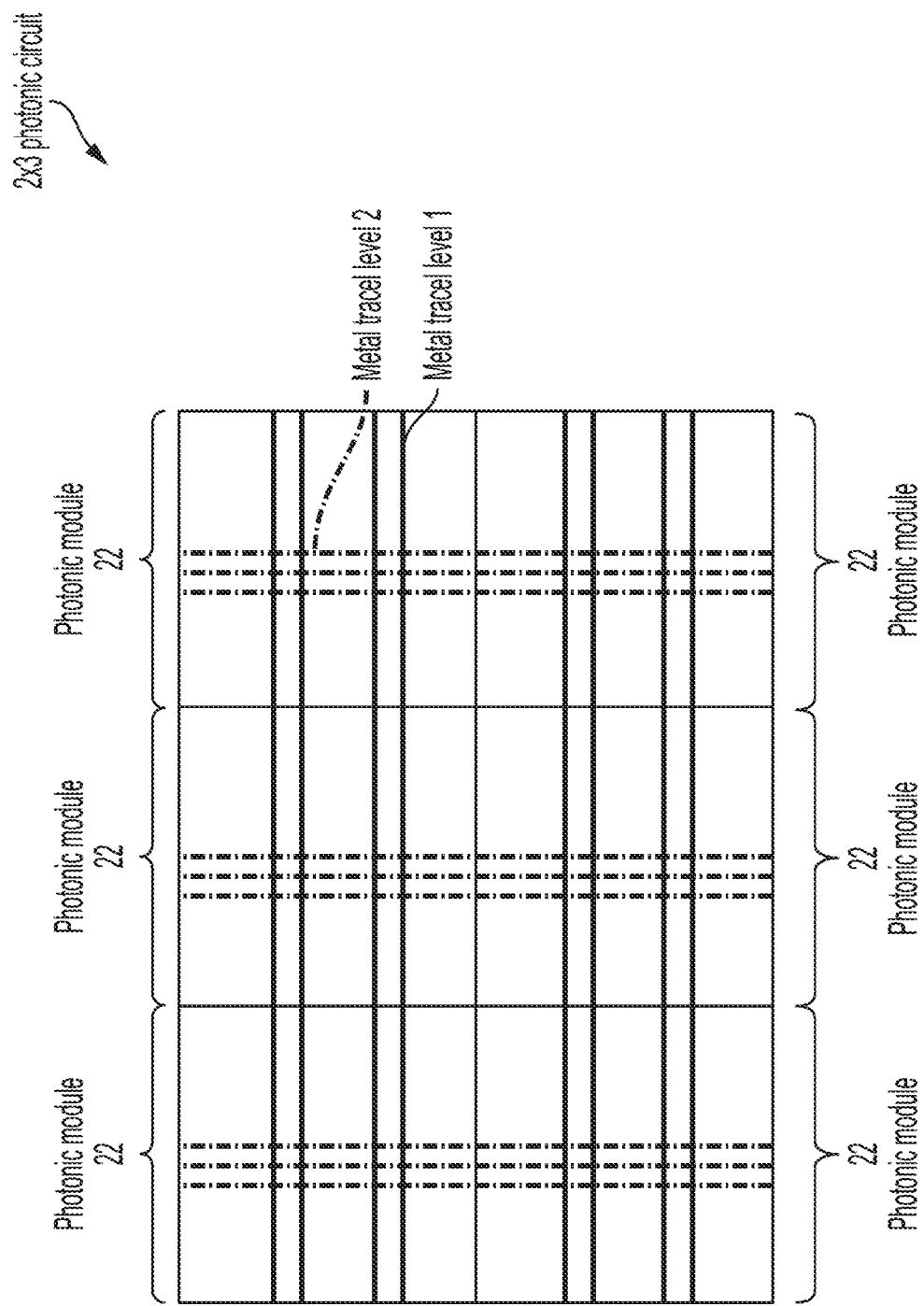
FIG. 4 illustrates a group of photonic modules sharing the same pattern of metal traces, in accordance with some embodiments.

In some embodiments, photonic modules 22 may be patterned according to a common metal trace photomask. As a result, the photonic modules share the same pattern of metal traces. In some embodiments, photonic modules 22 are patterned according to multiple common photomasks. As a result, multiple levels of metal traces share the same patterns across different photonic modules. Some of the metal traces may be used to deliver power across a photonic circuit. For example, some of the metal traces may be arranged to form a power grid, as discussed in detail further below. FIG. 4 illustrates a 2×3 photonic circuit, in which each photonic module 22 shares the same pattern of metal traces. For the sake of illustration, only the metal traces are shown in this figure, though each photonic module further includes waveguides, one or more out-of-plane couplers and optical distribution networks. In this example, there are two levels of metal traces. The metal traces of each level has been fabricated using the same photomask across the different photonic modules. The metal traces of metal trace level 1 run in the horizontal direction, thereby electrically coupling photonic modules that are adjacent to one another in the horizontal direction. The metal traces of metal trace level 2 run in the vertical direction, thereby electrically coupling photonic modules that are adjacent to one another in the vertical direction. Of course, other arrangements are also possible. For example, in other embodiments, the metal traces of the same level may electrically couple one photonic module to all the photonic modules that are adjacent to it.

The metal traces are arranged to carry electricity (e.g., signals and/or power) across the boundaries of the photonic modules. This may be achieved by patterning metal traces to be continuous across the boundaries of the photonic modules. In this example, the metal traces of level 1 are continuous across the vertical boundaries, and the metal traces of level 2 are continuous across the horizontal boundaries. Metal traces of different levels may be connected to one another using vias. In some embodiments, the photonic modules may share the same patterns of vias. In other words, the same via photomask may be used for each photonic module. In some embodiments, the photonic modules may have more (tens to hundreds of) metal traces. Some of these metal traces may be arranged to be continuous across photonic modules but, in some embodiments, a majority of the metal traces need not be patterned to be continuous across modules.

IV. Multi-User Operation

The photonic communication platforms described herein may support multi-user operations. The inventors have appreciated that the entire computing cluster of a photonic wafer may be too large for use by a single user, which could result in significant downtime of computing resources. Leveraging the platforms described herein, the same wafer can support use by multiple users in parallel. For example, different portions of a cluster may be licensed to different customers, thereby increasing the utilization of the cluster.

Figure 5A:
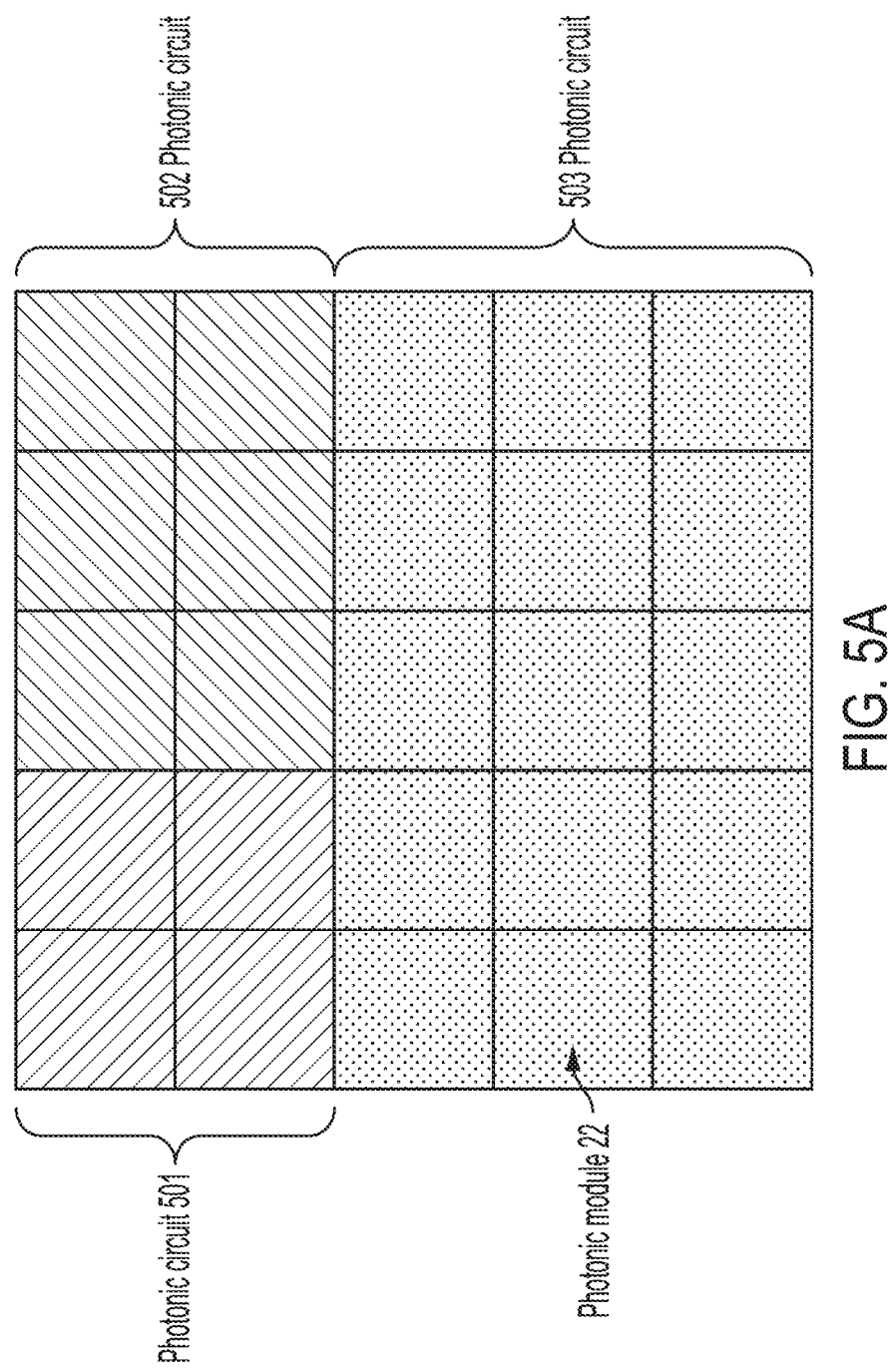
FIG. 5A illustrates an example of a portion of a wafer supporting use by multiple users, in accordance with some embodiments.

FIG. 5A illustrates an example of a portion of a wafer supporting use by multiple users in parallel, in accordance with some embodiments. The wafer portion of FIG. 5A supports three distinct photonic circuits (501, 502 and 503), each of which is monolithically integrated with the wafer's substrate. Photonic circuit 501 is formed by a 2×2 cluster of photonic modules. Photonic circuit 502 is formed by a 2×3 cluster of photonic modules. Photonic circuit 503 is formed by a 3×5 cluster of photonic modules. In some embodiments each cluster of photonic modules may be licensed to a different users. Each user may use the allocated cluster in combination with electronic processors, graphic processing units (GPU), memories and/or other electronic integrated circuits to form a desired computing architecture.

Figure 5B:
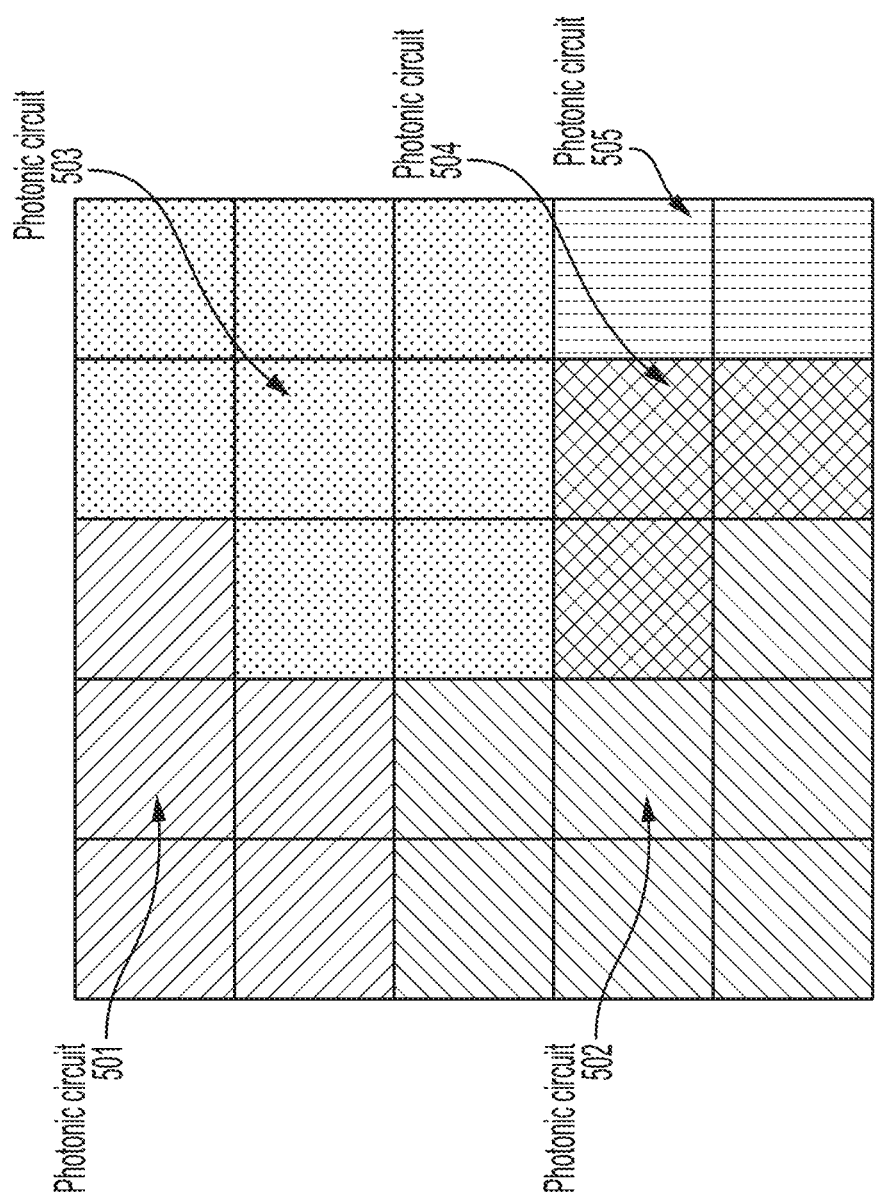
FIG. 5B illustrates another example of a portion of a wafer supporting use by multiple users, in accordance with some embodiments.
Figure 5C:
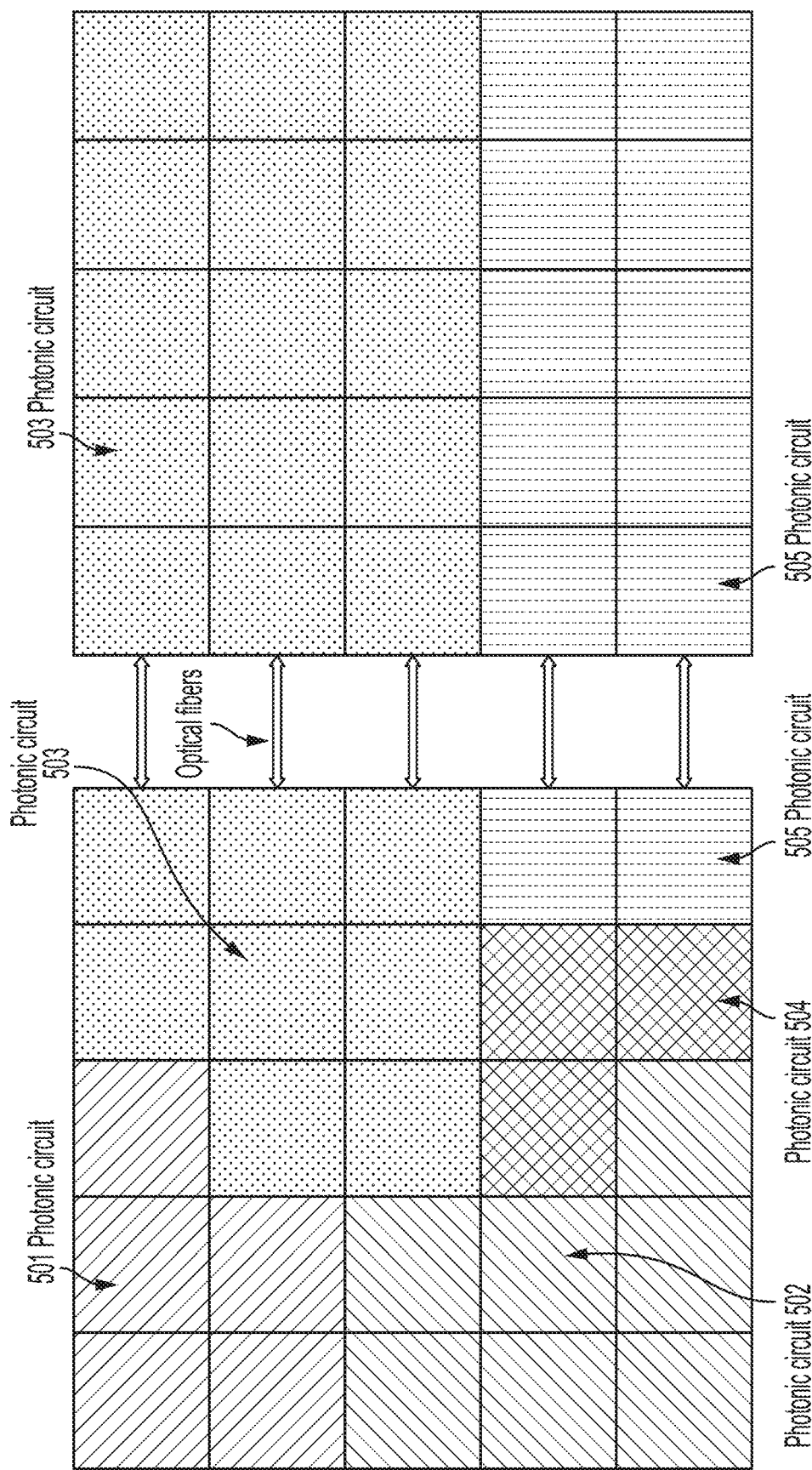
FIG. 5C illustrates yet another example of a portion of a wafer supporting use by multiple users, in accordance with some embodiments.

It should be noted that photonic circuits of the types described herein may have any arbitrary shapes. In the example of FIG. 5B, the wafer is also partitioned in photonic circuits (501, 502, 503, 504 and 505), but the photonic circuits have shapes other than a square or rectangular arrangement of photonic modules. Further, the photonic modules of a photonic circuit need not be adjacent. In the example of FIG. 5C, non-adjacent portions of photonic circuit 503 are coupled together via optical fibers. Similarly, non-adjacent portions of photonic circuit 505 are also coupled together via optical fibers. The non-adjacent portions may be part of separate wafers or of the same wafer.

Figure 6:
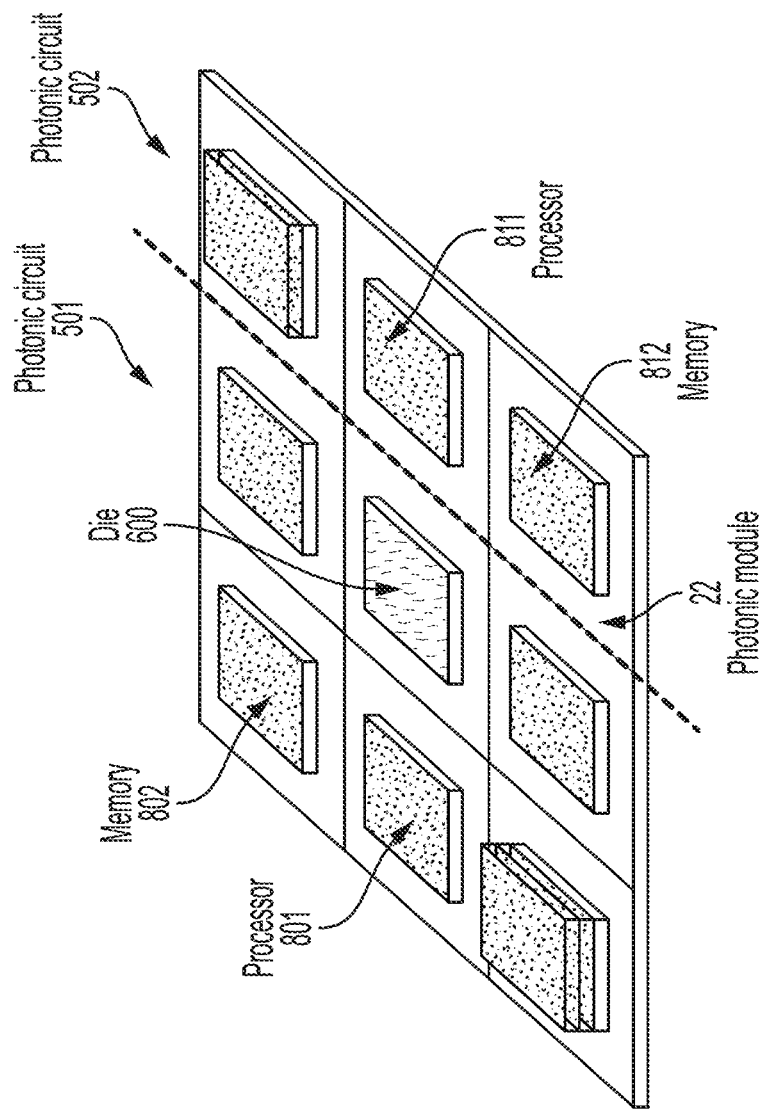
FIG. 6 illustrates two computing systems built on adjacent clusters of photonic modules, in accordance with some embodiments.

FIG. 6 illustrates two computing systems built on adjacent clusters of photonic modules, in accordance with some embodiments. More specifically, FIG. 6 illustrates a computing system built on a portion of photonic circuit 501 and a computing system built on a portion of photonic circuit 502. Photonic circuit 501 may be allocated for use by a first user and photonic circuit 502 may be allocated for use by a second user. The computing system built on photonic circuit 501 includes a processor die 801, a memory die 802 and other unlabeled dies. The computing system built on photonic circuit 502 includes a processor die 811, a memory die 812 and other unlabeled dies. In some embodiments, the dies of FIG. 6 are stacked on top of the wafer hosting the photonic circuits. For example, each die may be stacked on top of a corresponding photonic module. Each die may electrically communicate with the underlying photonic module using vias or other types of interconnects.

Figure 7:
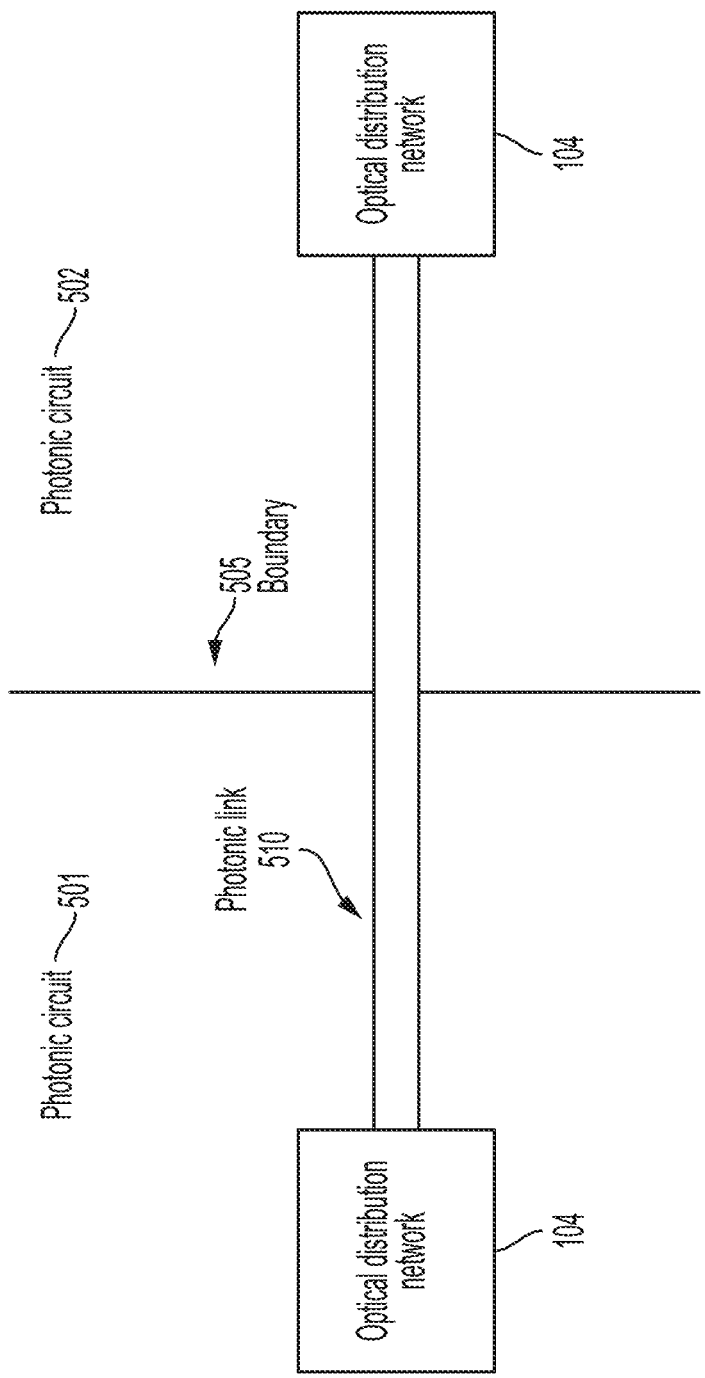
FIG. 7 illustrates a pair of adjacent photonic modules in additional detail, in accordance with some embodiments.

The inventors have appreciated that allowing communication to occur across the boundary defined between photonic circuit 501 and photonic circuit 502 would undermine the security of the data reserved to either user. FIG. 7 illustrates a pair of adjacent photonic modules in additional detail. The photonic module on the left-hand side of FIG. 7 is part of photonic circuit 501 and the photonic module on the right-hand side of FIG. 7 is part of photonic circuit 502. Boundary 505 is defined between the adjacent photonic modules. In some embodiments, boundary 505 represents an imaginary boundary. For example, the wafer may lack physical dividers between adjacent photonic modules of a common photonic circuit or physical dividers between adjacent photonic modules of different photonic circuits. The imaginary boundary can be formed by switching the photonic switches within the wafer such that no signals from parts of the wafer used by the first user travels to parts of the wafer used by the second user. In some embodiments, the photonic switches may not have perfect extinction ratio and/or there may be photonic/electronic crossings between the signals of the two users. In this case, cross-talk of some signals to a certain percentage is unavoidable. In this case, it is preferable that the wafer be designed such that the maximum amount of cross-talk is below what can be discerned using the signal receivers/detectors within the system. Alternatively, physical dividers (e.g., trenches formed through the substrate, semiconductor barriers, etc.) may be placed between adjacent photonic modules of different photonic circuits, but the same types of dividers may also be placed between adjacent photonic modules of a common photonic circuit. In this way, the photonic modules may be reconfigured over time to form different architectures. For example, at one time two photonic modules may be part of a common photonic circuit, and, at a later time, the same two photonic modules may be part of different photonic circuits.

Photonic links 510 (e.g., optical waveguides) connect pairs of adjacent photonic modules together, whether or not the adjacent photonic modules are configured to be part of the same photonic circuit or different photonic circuits. However, when adjacent photonic modules are configured to be part of different photonic circuits as in FIG. 7—and as a result, to be used by different users—the photonic link 510 may be interrupted, thereby isolating the photonic circuits from each other. When interrupted, a photonic link does not permit passage of light encoded with data reserved to a user, or does not permit passage of light at all (although light in the form of noise may pass).

A trusted controller may be used to arbitrate allocation of photonic modules among different users. In some embodiments, the trusted controller may be a die disposed on the photonic communication platform alongside the dies of the users, but may not be accessible by the users. The trusted controller may be accessible only by the operator of the photonic communication platform. Referring back to FIG. 6, the photonic module on which die 600 is disposed may be reserved to the network operator, and die 600 may include a trusted controller. In other embodiments, the trusted controller may include a chip positioned outside the wafer. Among other functions, the trusted controller may control interruption/establishment of photonic links, thereby enabling isolation between adjacent photonic modules or communication between adjacent photonic modules, depending on the needs of the platform.

Figure 8:
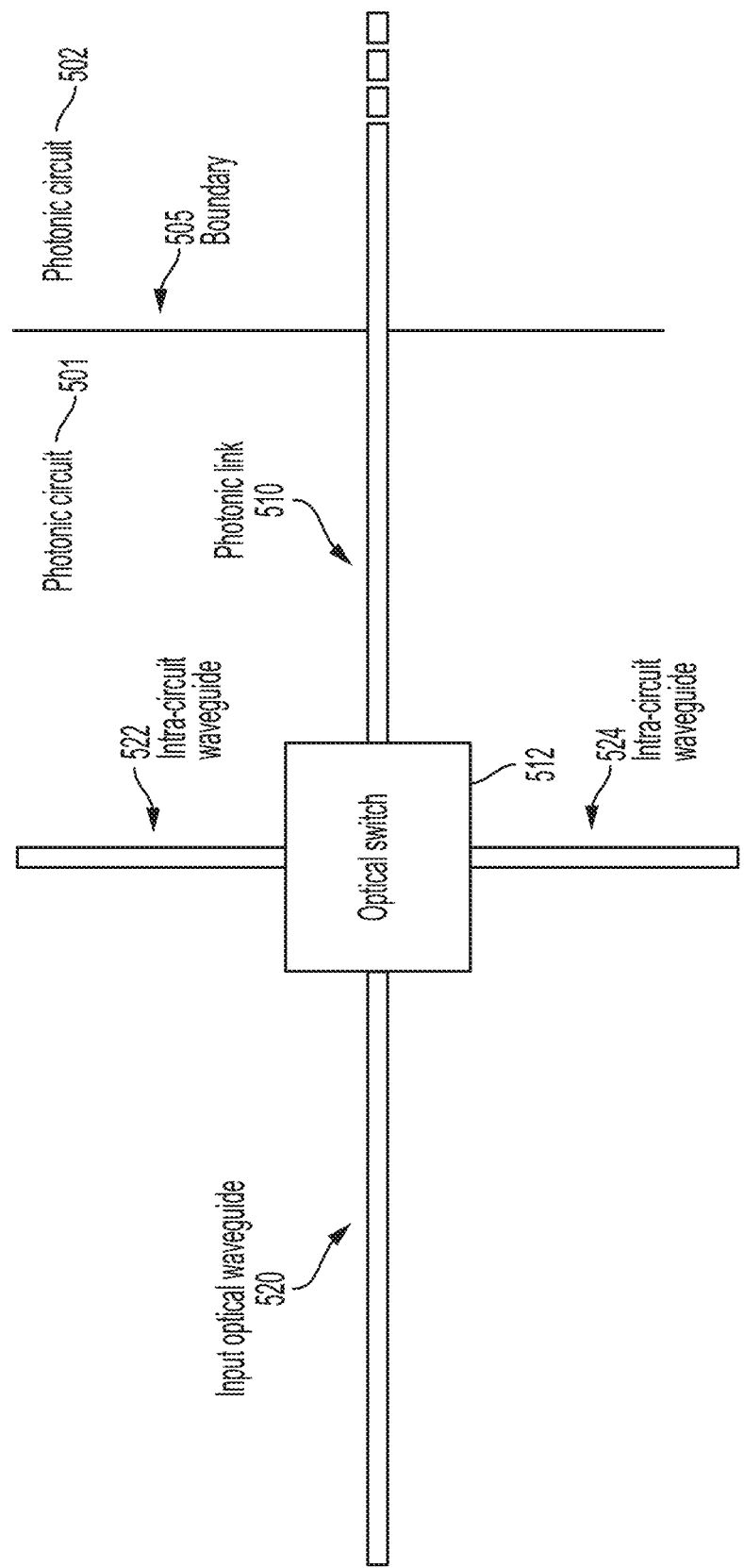
FIG. 8 illustrates an optical switch coupled to a photonic link, in accordance with some embodiments.

Interruption/establishment of a photonic link may be performed in some embodiments using optical switches (e.g., the optical switches of the optical distribution networks 104). FIG. 8 illustrates an example optical switch. In this example, optical switch 512 has one input, (waveguide 520), and three outputs (intra-circuit waveguides 522 and 524 and photonic link 510). Intra-circuit waveguides 522 and 524 are waveguides coupling to adjacent photonic modules of the same photonic circuit (501) of which optical switch 512 is part. Photonic link 510 is a waveguide that couples to an adjacent photonic module of another photonic circuit (502). Thus, photonic link 510 intersects boundary 505. In some embodiments, interrupting the photonic link 510 involves controlling switch 512 to route the light provided via waveguide 520 away from link 510 (e.g., by routing the light to waveguide 522, waveguide 524, or both).

Switch 512 may be controlled using the trusted controller. Thus, the trusted controller provides and denies access to photonic circuits to users depending on which photonic links are established and which photonic links are interrupted. In one example, the trusted controller provides access to the first photonic circuit to a first user, and provides access to the second photonic circuit to a second user. In some such embodiments, the trusted controller may further deny access to the first photonic circuit to the second user, and deny access to the second photonic circuit to the first user.

Switch 512 may include any type of electronically (or optically) controllable optical switch. In some embodiments, switch 512 includes a Mach-Zehnder interferometer. The Mach-Zehnder interferometer has a first output arm and a second output arm. The first output arm may be connected to photonic link 510 and the second output arm may be connected to another waveguide (e.g., waveguide 522). In this scenario, controlling the optical switch to route light away from the photonic link comprises controlling the Mach-Zehnder interferometer to route the light to the second output arm of the Mach-Zehnder interferometer. Nested Mach-Zehnder interferometers may be employed to switch between more than two output waveguides. The Mach-Zehnder interferometers may use thermal heater, carrier injection/depletion, or mechanical modulation schemes. In other embodiments, switch 512 may include a resonant switch, such as a ring or disc resonator and coupled resonators or coupler-resonator optical waveguide (CROW). Further, the data transmitted by each user can be distinguished using their optical wavelengths.

V. Additional Comments

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than described, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A photonic communication platform, comprising:
    a substrate;
    a first photonic circuit monolithically integrated with the substrate, wherein the first photonic circuit is patterned with a first plurality of photonic modules;
    a second photonic circuit monolithically integrated with the substrate, wherein the second photonic circuit is patterned with a second plurality of photonic modules;
    a photonic link coupling the first photonic circuit to the second photonic circuit; and
    a controller configured to arbitrate allocation of the first and second plurality of photonic modules between a first user and a second user, wherein arbitrating comprises:
        causing optical isolation of the first photonic circuit from the second photonic circuit by optically interrupting the photonic link.

2. The photonic communication platform of claim 1, further comprising an optical switch having an output coupled to the photonic link, wherein optically interrupting the photonic link comprises controlling the optical switch to route light away from the output.

3. The photonic communication platform of claim 2, wherein the optical switch comprises a Mach-Zehnder interferometer and the output comprises a first output arm of the Mach-Zehnder interferometer, wherein controlling the optical switch to route light away from the output comprises controlling the Mach-Zehnder interferometer to route the light to a second output arm of the Mach-Zehnder interferometer.

4. The photonic communication platform of claim 1, wherein the controller is
    further configured to:
    provide access to the first photonic circuit to the first user; and
    provide access to the second photonic circuit to the second user.

5. The photonic communication platform of claim 4, wherein the controller is
    further configured to:
    deny access to the first photonic circuit to the second user; and
    deny access to the second photonic circuit to the first user.

6. The photonic communication platform of claim 1, further comprising:
    a first die in communication with a first photonic module of the first plurality; and
    a second die in communication with a first photonic module of the second plurality.

7. The photonic communication platform of claim 6, wherein the first die is stacked on top of the first photonic module of the first plurality and the second die is stacked on top of the first photonic module of the second plurality.

8. The photonic communication platform of claim 6, wherein the first die is electronically isolated from the second die.

9. The photonic communication platform of claim 6, wherein the first die comprises a first processor and the second die comprises a second processor.

10. The photonic communication platform of claim 6, wherein:
    the first photonic circuit places the first die in optical communication with a third die, the third die being in communication with a second photonic module of the first plurality; and
    the second photonic circuit places the second die in optical communication with a fourth die, the fourth die being in communication with a second photonic module of the second plurality.

11. A photonic communication platform, comprising:
    a substrate;
    a plurality of photonic modules, a first subset of the plurality of photonic modules being copies of a first template photonic module and a second subset of the plurality of photonic modules being copies of a second template photonic module;
    a first photonic circuit monolithically integrated with the substrate, wherein the first photonic circuit is patterned with at least one photonic module of the first subset of the plurality of photonic modules and/or at least one photonic module of the second subset of the plurality of photonic modules;
    a second photonic circuit monolithically integrated with the substrate, wherein the second photonic circuit is patterned with at least one photonic module of the first subset of the plurality of photonic modules and/or at least one photonic module of the second subset of the plurality of photonic modules;
    a photonic link coupling the first photonic circuit to the second photonic circuit; and a controller configured to arbitrate allocation of the plurality of photonic modules between a first user and a second user, wherein arbitrating comprises:
    causing optical isolation of the first photonic circuit from the second photonic circuit by optically interrupting the photonic link.

12. The photonic communication platform of claim 11, wherein:
    the first template photonic module is patterned using a first set of photomasks; and
    the second template photonic module is patterned using a second set of photomasks.

13. The photonic communication platform of claim 12, wherein:
    the first set of photomasks and the second set of photomasks share at least one common photomask.

14. The photonic communication platform of claim 13, wherein:
    the at least one common photomask is a waveguide photomask.

15. The photonic communication platform of claim 11, wherein:
    the substrate further comprises an optical switch having an output coupled to the photonic link, wherein optically interrupting the photonic link comprises controlling the optical switch to route light away from the output.

16. The photonic communication platform of claim 15, wherein the optical switch comprises a Mach-Zehnder interferometer and the output comprises a first output arm of the Mach-Zehnder interferometer, wherein controlling the optical switch to route light away from the output comprises controlling the Mach-Zehnder interferometer to route the light to a second output arm of the Mach-Zehnder interferometer.

17. The photonic communication platform of claim 11, wherein the controller is further configured to:
    provide access to the first photonic circuit to a first user and deny access to the first photonic circuit to a second user; and
    provide access to the second photonic circuit to the second user and deny access to the photonic circuit to the first user.

18. The photonic communication platform of claim 11, further comprising:
    a first die in communication with a first photonic module of the photonic modules of the first photonic circuit; and
    a second die in communication with a first photonic module of the photonic modules of the second photonic circuit and electronically isolated from the first die.

19. The photonic communication platform of claim 18, wherein:
    the first die is stacked on top of the first photonic module of the photonic modules of the first photonic circuit; and
    the second die is stacked on top of the first photonic module of the photonic modules of the second photonic circuit.

20. The photonic communication platform of claim 18, wherein:
    the first die comprises a first processor and the second die comprises a second processor.

* * * * *